United States Patent [19]

Adams et al.

[11] 4,424,947

[45] Jan. 10, 1984

[54] HELICOPTER DEICER SYSTEM POWER TRANSFER ASSEMBLY

[75] Inventors: Lowell J. Adams, Tallmadge; David B. Sweet, Hartville, both of Ohio

[73] Assignee: The B. F. Goodrich Company, New York, N.Y.

[21] Appl. No.: 279,884

[22] Filed: Jul. 2, 1981

[51] Int. Cl.³ .................................................. B64D 15/12
[52] U.S. Cl. ................................. 244/134 D; 219/202; 219/483; 339/5 M; 416/95
[58] Field of Search ....................... 244/134 R, 134 D; 416/95, 500, 39, 35, 244; 339/5 R, 5 M, 8 R, 138, 140 R, 93 R; 340/580; 219/451, 483, 201, 202

[56] References Cited

U.S. PATENT DOCUMENTS

| | | | |
|---|---|---|---|
| 1,821,132 | 9/1931 | Baker | 339/138 |
| 3,218,595 | 11/1965 | Motsinger | 339/5 M |
| 3,317,878 | 5/1967 | Garls et al. | 339/5 R |
| 3,496,331 | 2/1970 | Fleury et al. | 244/134 D |
| 3,988,049 | 10/1976 | Williams et al. | 339/5 M |
| 4,083,518 | 4/1978 | Garrison et al. | 244/17.11 |

*Primary Examiner*—Galen L. Barefoot
*Attorney, Agent, or Firm*—Michael J. Colitz, Jr.

[57] ABSTRACT

A device (10) for isolating from vibrational and impulse loads a power transfer unit (14) that transfers power from a helicopter electrical system to a plurality of deicing segments on the rotor blades includes a distributor (13) rotating with the rotor blades for distributing power from the power transfer unit (14) to the deicing segments, a housing (11) having an upper cylinder (24) and lower cylinder (23) the latter of which is flexibly secured to the helicopter as by a joint including ball (40), housing 11 substantially isolating the power transfer unit (14) from such loads, and a shaft (12) rotatably engaging the upper cylinder (24) for carrying the distributor (13) in rotation with the rotor blades.

14 Claims, 2 Drawing Figures

HELICOPTER DEICER SYSTEM POWER TRANSFER ASSEMBLY

TECHNICAL FIELD

The present invention relates generally to the distribution of electrical power from a source of power upon a fixed frame to a plurality of load elements on at least one rotating member. More specifically the present invention pertains to the sequential distribution of electrical power to a plurality of electrically heated deicing elements in aircraft propeller or helicopter rotor blade deicing systems. In particular, the present invention relates to a device for isolating from vibration and impulse loads a power transfer unit that transfers power from a helicopter electrical power generating system to a plurality of deicing elements on the rapidly rotating main and tail rotor blades.

BACKGROUND ART

Aircraft deicing systems are well-known and widely used safety devices for the removal of ice accumulated on aerodynamically significant aircraft surfaces, such as propeller and helicopter rotor blade airfoils. It has been found that cycling the application of heat to the leading edge of the airfoil in cordwise or spanwise segments results in substantially improved ice shedding characteristics with significantly reduced energy requirements. Accordingly, most present-day aircraft deicing systems incorporate a plurality of electrical resistance-type heating elements, known as deicing segments, which are cyclically and cyclically energized in symmetrical sets on opposing blades.

In order to selectively energize each deicing segment, a separate electrical connection was necessary for each opposing pair of deicing segments and a single additional electrical connection, common to all deicing segments, was required to complete each two-wire deicing segment circuit. Unfortunately, the energy requirements of these deicing segments are such that power must be obtained from one of the electrical power generators located elsewhere on the aircraft. Thus, some mechanism is required for coupling the power from the aircraft's fixed generating system to the rapidly rotating propeller or rotor blades. Historically, a suitable plurality of brush block assemblies were rigidly mounted to the aircraft, and slip-ring assemblies positioned on the rotating propeller or rotor drive shaft to effectuate this coupling. More recently systems have been developed which permit the sequential distribution of electrical power to any number of deicing segments with only two separate slip-ring assemblies, as evidenced by U.S. patent application Ser. No. 009,636 filed Feb. 5, 1979, now U.S. Pat. No. 4,292,502, and owned by the assignee of the present invention. However, irrespective of their number, such assemblies are subject to substantial wear, require frequent maintenance and replacement and, in large part due to vibrational and impulse loads placed thereon, present a constant threat of in-flight deicing system failure.

In an effort to minimize the difficulties that arise in conducting an electrical signal between a fixed frame and a member rotating with respect thereto, a manufacturer doing business as Mercotac, Inc. of San Diego, Calif. has designed a four conductor sealed power transfer units having the model designation Mercotac 540 for transferring both signal and power level currents required by the helicopter deicing system elements. However, the Mercotac 540, even more so than conventional slip-ring assemblies, cannot withstand vibrational and impulse loads without significant degradation in performance, vastly accelerated breakdown rates and much shorter times to total failure. Accordingly, it is not believed that any successful attempt has previously been made to adopt power transfer units other than conventional slip-ring assemblies to the transfer of electrical power from a helicopter power system to helicopter deicing segments.

DISCLOSURE OF INVENTION

It is, therefore, an object of the invention to provide a device for isolating from substantially all vibrational and impulse loads a power transfer unit that transfers power from a source of power upon a fixed frame to a plurality of load elements on at least one rotating member.

It is a further object of the invention to provide a device for isolating a power transfer unit from substantially all vibrational and impulse loads, as set forth above, wherein the device transfers such loads from the fixed frame to the rotating member.

It is still a further object of the invention to provide a device for isolating a power transfer unit from substantially all vibrational and impulse loads, as set forth above, wherein the device absorbs some of such loads from the fixed frame.

It is yet a further object of the invention to provide a device for isolating a power transfer unit from substantially all vibrational and impulse loads, as set forth above, wherein the fixed frame is a helicopter and the rotating member is a main or tail rotor blades to which is affixed a plurality of deicing segments.

It is another object of the invention to provide a device for isolating a power transfer unit from substantially all vibrational and impulse loads, as set forth above, in which the device assists in dissipating heat generated during operation by the power transfer unit.

It is still another object of the invention to provide a device for isolating a power transfer unit from substantially all vibrational and impulse loads, as set forth above, wherein the device may be housed entirely within the helicopter rotor mast so as to prevent damage or contamination from environmental elements to the device and the power transfer unit.

It is yet another object of the invention to provide a device for isolating a power transfer unit from substantially all vibrational and impulse loads, as set forth above, in which the device safely disconnects electrical conductors to the power transfer unit in the event of any mechanical failure within the power transfer unit.

These and other objects and advantages of the present invention over existing prior art forms will become more apparent and fully understood from the following description in connection with the accompanying drawings.

In general, a device for isolating from vibrational and impulse loads a power transfer unit that transfers power from a source of power upon a fixed frame to a plurality of load elements on at least one rotating member includes a distributor rotating with the rotating member for distributing power from the power transfer unit to the plurality of load elements, a housing flexibly secured to the fixed frame for supporting the power transfer unit and substantially isolating the power transfer unit from the vibrational and impulse loads, and a shaft rotatably engaging the housing for carrying the distributor in rotation with the rotating member.

PREFERRED EMBODIMENT FOR CARRYING OUT THE INVENTION

Figure 1:
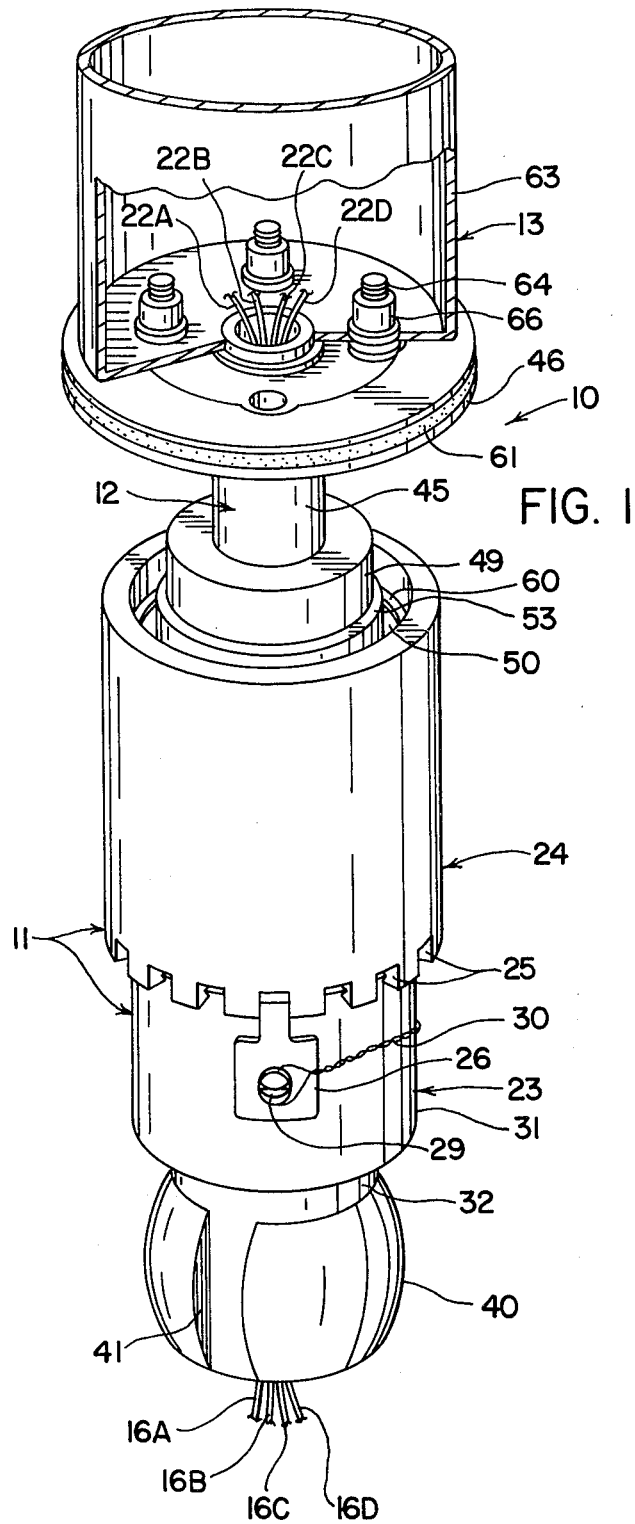
FIG. 1 is a perspective view of a shock protection device embodying the concepts of the present invention for a helicopter deicer system power transfer unit.

FIG. 1 illustrates a device, generally indicated by the numeral 10, for isolating from vibrational and impulse loads a power transfer unit that transfers electrical power from a power generating system fixed to a helicopter to a plurality of deicing elements upon at least one rotating rotor blade. In this depicted embodiment device 10 broadly includes a substantially cylindrical housing 11, a hollow, rotatable shaft 12, and a distributor 13. These structural units may be formed of any of a number of load bearing materials, preferably lightweight metals as aluminum, as would occur to persons skilled in the art. Although for convenience device 10 is depicted and shall hereinafter be referred to in the description with the longitudinal axis of housing 11, shaft 12 and distributor 13 aligned in vertical orientation, it should be appreciated that the device may be mounted and will operate equally well in any attitudinal position.

Figure 2:
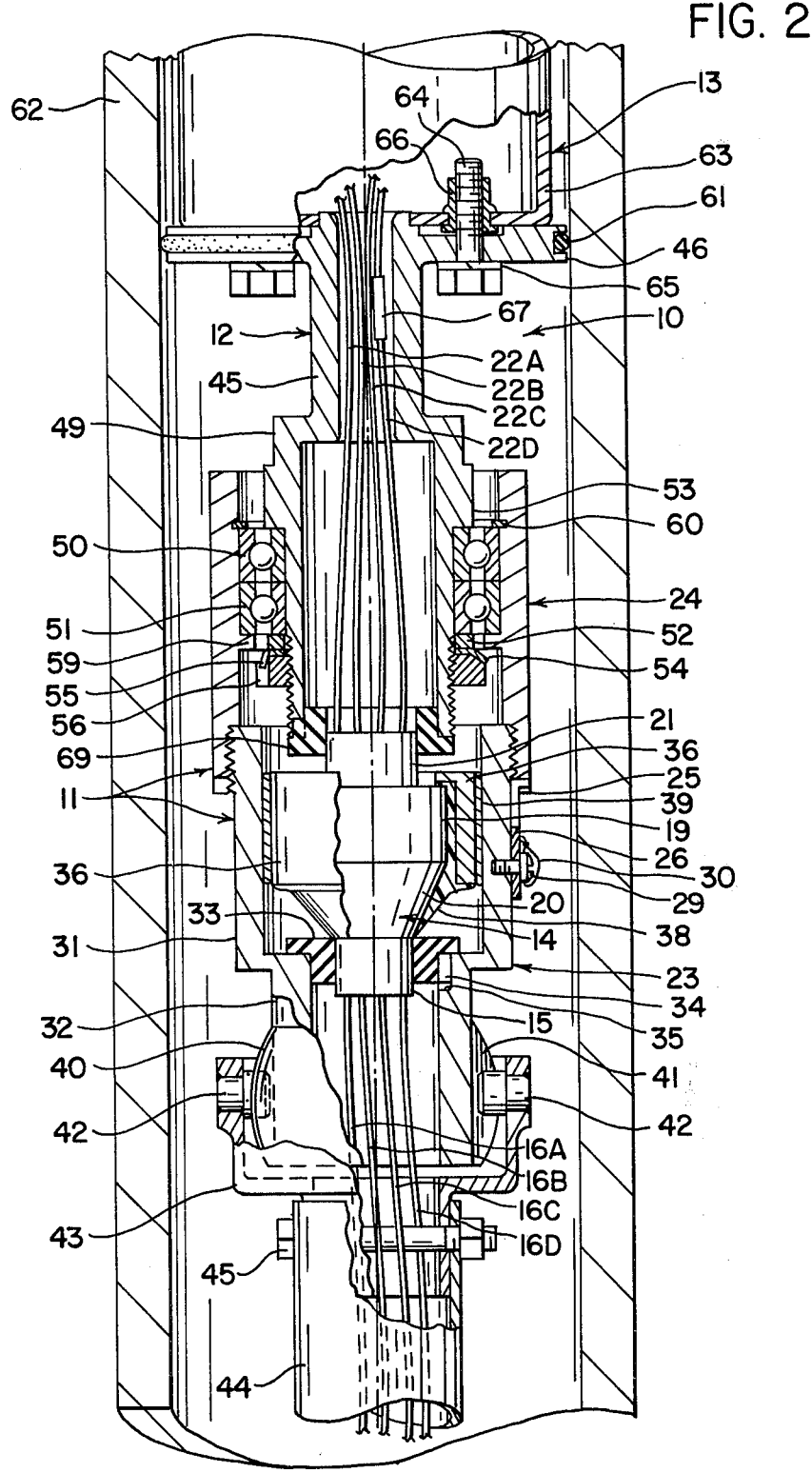
FIG. 2 is an elevational section of the device depicted in FIG. 1 in its usual environment of a rotating helicopter mast, illustrating an exemplary flexible engagement of the device housing with the helicopter frame and the mounting of a distributor to the rotating shaft of the device.

Device 10 is suitable for use with any mechanism for connecting one or more stationary electrical conductors to one or more rotating electrical conductors, such as that manufactured by Mercotac, Inc. of San Diego, Calif. having the model designation 540. This so-called Mercotac 540, hereinafter called power transfer unit 14, is a generally cylindrical, sealed, liquid-mercury contact unit designed to interconnect up to four electrical conductors. Inasmuch as the application of power transfer unit 14 in a helicopter system as illustrated herein requires operation at temperatures lower than that for which the Mercotac 540 is designed, suitable changes for proper operation throughout the possible range of temperatures (such as the substitution of a Thallium Mercury alloy for the power contact medium) may be made therein. As best seen in FIG. 2, power transfer unit 14 includes a stationary lower cylindrical block 15 which receives the conductors 16A-16D from the helicopter power generating system, a cylindrical bearing housing 19, a tapered conical section 20 integrally joining block 15 and housing 19, and a rotating upper cylindrical block 21 which receives the conductors 22A-22D from the plurality of deicing elements.

Housing 11 includes substantially cylindrical lower housing 23 and upper housing 24, each of such diameter that power transfer unit 14 may nestle within lower housing 23 as detailed hereinafter and upper housing 24 may be removably engaged, as by a conventional threaded coupling integrally formed on the exterior of the upper end of lower housing 23 and the interior of the lower end of upper housing 24.

In order to insure that lower housing 23 and upper housing 24 do not become separated when in use, a multiple locking feature may be incorporated as shown in both FIGS. 1 and 2. To effectuate this multiple lock, teeth 25 are cut in the lower end of upper housing 24 and a suitable plurality of a substantially L-shaped locking brackets 26 secured to the outer periphery of lower housing 11 in any acceptable manner as with screws 29, the latter of which may be interconnected with safety wire 30. Once upper housing 24 is threaded onto lower housing 23 as far as possible, brackets 26 are inserted into whichever tooth 25 is aligned therewith, bracket 26 secured to lower housing 23 with screws 29, and safety wires 30 affixed thereto.

In order both to properly support power transfer unit 14 and to provide flexible connection of housing 11 to the helicopter as further delineated below, lower housing 23 is formed of two integral cylinders 31 and 32 having different diameters. Cylinder 31, whose free end is threaded as explained hereinabove, is of somewhat larger inside diameter than the outside diameter of cylindrical bearing housing 19. Block 15 is positioned inside a flanged annular gasket 33 which in turn is seated at the interface of cylinders 31 and 32. Gasket 33, which is preferably formed of any resilient material (such as silicone) as would occur to the skilled artisan, includes a tang 34 for non-rotational interlocking with a notch 35 in the interior surface of cylinder 32 at its interface with cylinder 31.

A flanged cylindrical heat sink 36 is placed coaxial with cylindrical bearing housing 19 and is fixed to the latter by use of any thermally conductive epoxy 38. Where the outer casing of power transfer unit 14 is made of electrically conductive material, epoxy 38 also preferably should be electrically non-conductive to electrically isolate power transfer unit 14 from housing 11. One epoxy that meets both these specifications is known as Thermalbond 4952 manufactured by Thermally, Inc. of Dallas, Texas. The side of the heat sink 36 not bonded to cylindrical bearing housing 19 is fixed to the interior surface of cylinder 31 either directly or indirectly as through a thermally conductive grease 39. It therefore should now be evident that power transfer unit 14 is supported by lower housing 23 in such manner as to facilitate the transfer and dissipation of heat from power transfer unit 14.

Integrally formed with the lower end of cylinder 32 on its exterior is a ball 40 which, as part of a ball joint, provides a flexible interconnection to the helicopter frame for transmitting substantially all vibrational and impulse loads to housing 11. Two vertical slots 41 cut opposite each other on the exterior of ball 40 receive pins 42 affixed to a yoke 43 rigidly connected to a standpipe 44 by a bolt 45 passing through both the base of yoke 43 and standpipe 44. The end of standpipe 44 not bolted to yoke 43 is connected in a manner not relevant herein to the helicopter, resulting in substantially all vibration and impulse loads from the helicopter being transmitted to housing 11 and not to power transfer unit 14. Additionally, where pins 42 are made to fit loosely within slots 41, the ball joint itself minimizes transfer of mechanical motion from the helicopter frame to power transfer unit 14.

Shaft 12 includes a narrow central portion 45, a circular plate 46 atop central portion 45 to which is mounted distributor 13, and a wider, lower portion 49 which is rotatably borne by upper housing 24. Two pressure-sealed ball bearings 50 and 51 and a spacer 52 are sandwiched between a ring protrusion 53 in the sidewall of the lower portion 49 of shaft 12 and a lock washer 54 with exterior teeth interlock 55 and nut 56 screwed to threads in the end of the lower portion 49 of shaft 12 furthest from plate 46. A circular flange 59 of the same height as that of spacer 52 is integrally formed with and interior upper housing 24 upon which bearings 51 may rest, and a snap ring 60 secured to the inside of upper housing 24 atop bearing 50, thereby maintaining bearings 50, 51 and shaft 12 in a fixed spatial position relative to and a rigid connection with housing 11.

A flanged annular gasket 69, similar to that of gasket 33 fits in the threaded end of the lower portion 49 of shaft 12 and receives rotating block 21 of power transfer unit 14. Conductors 22A-22D, inclusive, pass through gasket 33 and the center of shaft 12 into distributor 13.

In operation it may now be understood that with the exception of cylindrical block 21, all illustrated exterior portions of power transfer unit 14 and all portions of housing 11 remain at all times stationary. On the other hand, as distributor 13 rotates, so rotates in fixed relation shaft 12, the bearings within sealed ball bearings 50 and 51, cylindrical block 21 and conductors 22A-22D, inclusive. Circular plate 46 as illustrated in FIGS. 1 and 2 includes a channel in which is seated O-ring 61 for interference fit within cylindrical helicopter rotor mast pipe 62 to further promote this rotation and maintain device 10 in otherwise non-contacting spatial relation therewith.

Distributor 13 includes electrical components not relevant herein as is required by the deicer power distribution system, all of which may be contained in a cylindrical case 63. Case 63 may be mounted to plate 46 by any acceptable technique as a plurality of bolts 64 passed through split washers 65 and plate 46 for insertion into threaded collars 66 riveted to case 63.

In certain applications it may be desirable to provide some mechanism to protect device 10 from possible damage resulting from a mechanical failure of power transfer unit 14. For example, where a Mercotac 540 is employed as power transfer unit 14 there exists the unlikely possibility that the bearing therein may seize, causing conductors 22A-22D and/or conductors 16A-16D to very quickly twist under tension until they literally snap apart, potentially inflicting damage to device 10 and rotor mast pipe 62. By incorporating a conventional in-line pin conductor 67 in each conductor in which failure may be anticipated, if for any reason that conductor should begin to twist it will simply, quickly and harmlessly pull apart at the connector 67. Other mechanisms for preventing damage in such circumstances that would occur to the ordinarily skilled artisan are of course alternately acceptable for use within device 10.

Having described the detailed and operational construction of device 10, it should now be evident that substantially all vibration and impulse loading from the helicopter is transmitted to the distributor 13 through housing 11 and shaft 13, power transfer unit 14 being isolated therefrom. Moreover, the skilled artisan will appreciate that housing 11 facilitates the dissipation of heat from power transfer unit 14, without which power transfer unit 14 would have a much shorter operational lifetime. Of course the configuration of device 10 is suitable for relieving vibrational and impulse loads from mostly any device that interfaces between rotating and stationary frames of references, certainly substantially any cylindrical unit for interfacing electrical signals therebetween.

Inasmuch as the present invention is subject to many variations, modifications, and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of isolating from vibrational and impulse loads a power transfer unit that transfers electrical power from a source of power upon a fixed frame to a plurality of load elements on at least one rotating member.

We claim:

1. A device for isolation from vibrational and impulse loads a power transfer unit that transfers power from a source of power upon a fixed frame to a plurality of load elements on at least one rotating member, comprising:
   distributor means rotating with the rotating member for distributing power from the power transfer unit to the plurality of load elements;
   housing means flexibly supporting the power transfer unit and substantially isolating the power transfer unit from vibrational and impulse loads;
   shaft means rotatably engaging said housing means for carrying said distributor means in rotation with the rotating member and,
   a pipe rotatably extending from the fixed frame to contain and support said distributor means, housing means and shaft means.

2. A device, as set forth in claim 1, wherein the power transfer unit transfers power from a plurality of conductors stationary relatively to the fixed frame to a like plurality of conductors rotating relative to the fixed frame with the rotating member.

3. A device, as set forth in claim 2, wherein said housing means further includes first housing means for supporting the power transfer unit and second housing means secured to said first housing means for rotatably bearing said shaft means.

4. A device, as set forth in claim 3, wherein the power transfer unit is nested within said first housing means, said first housing means including joint means for flexible engagement with a standpipe secured to said fixed frame.

5. A device, as set forth in claim 4, wherein said first housing means and said second housing means are substantially cylindrical, said first housing means, said second housing means, said shaft means and said distributor means in axial alignment.

6. A device as set forth in claim 5, wherein said first housing means is secured to said second housing means by threaded coupling, said housing means further including bracket locking means for insuring the nonseparation of said first housing means and said second housing means during operation of the device.

7. A device, as set forth in claim 6, wherein said bracket locking means includes a plurality of teeth in the end of said first housing means to couple with said second housing means and a plurality of substantially L-shaped locking bracket means engaging selected of said plurality of teeth and removeably affixed to said first housing means.

8. A device, as set forth in claim 7, wherein said shaft means extends coaxially within said second housing means, said shaft means including bearing means interposed between said second housing means and said shaft means for permitting the free rotation of said shaft means within said second housing means.

9. A device, as set forth in claim 8, wherein said shaft means includes plate means for carrying said distributor at the end of said shaft means opposite that extended coaxially within said second housing means, said distributor means including case means for connection with said plate means.

10. A device, as set forth in claim 9, further including means for disconnecting said plurality of conductors connected to the power transfer unit in the event of entanglement placing said plurality of conductors under substantial tension.

11. A device, as set forth in claim 10, wherein said plate means is substantially the same size and shape as the interior of said second rotating member.

12. A device, as set forth in claim 1, wherein said housing means includes means for dissipating heat generated by the power transfer unit.

13. A device, as set forth in claim 12, wherein said means for dissipating heat includes a heat sink bonded to the power transfer unit with a thermally conductive material, said heat sink in thermally operative association with said first housing means.

14. A device, as set forth in claim 1 wherein said fixed frame is a helicopter, said plurality of load elements are deicing segments, and said rotating member is a rotor blade.

* * * * *